United States Patent [19]

Kurahashi et al.

[11] Patent Number: 5,437,349
[45] Date of Patent: Aug. 1, 1995

[54] ELECTRICALLY OPERATED POWER STEERING APPARATUS

[75] Inventors: Hidenori Kurahashi; Horishi Iwasaki; Hideki Hayakawa; Yuzo Nagai; Seiichi Hirai, all of Saitama, Japan

[73] Assignee: Honda Giken Kogyo Kabushiki Kaisha, Japan

[21] Appl. No.: 207,927

[22] Filed: Mar. 8, 1994

[30] Foreign Application Priority Data

| Mar. 8, 1993 | [JP] | Japan | 5-046220 |
| Mar. 8, 1993 | [JP] | Japan | 5-046221 |
| Mar. 8, 1993 | [JP] | Japan | 5-046538 |
| Mar. 8, 1993 | [JP] | Japan | 5-046539 |

[51] Int. Cl.⁶ ............................................. B62D 5/04
[52] U.S. Cl. ......................................................... 180/79.1
[58] Field of Search .................... 180/79.1, 79, 142

[56] References Cited

U.S. PATENT DOCUMENTS

| 4,415,054 | 11/1983 | Drutchas | 180/79.1 |
| 4,834,202 | 5/1989 | Shimizu | 180/79.1 |
| 4,868,477 | 9/1989 | Anderson et al. | 318/696 |
| 4,934,472 | 6/1990 | Bloor et al. | 180/79.1 |
| 5,092,417 | 3/1992 | Oslapas | 180/79.1 |
| 5,096,011 | 3/1992 | Oslapas | 180/79.1 |
| 5,257,828 | 12/1994 | Miller et al. | 180/79.1 |

FOREIGN PATENT DOCUMENTS

| 0351087 | 1/1990 | European Pat. Off. |
| 0403235 | 6/1990 | European Pat. Off. |
| 0528200 | 2/1993 | European Pat. Off. |
| 62-292576 | 12/1987 | Japan |
| 3-7661 | 1/1991 | Japan |
| 2226285 | 6/1980 | United Kingdom |

*Primary Examiner*—Margaret A. Focarino
*Assistant Examiner*—Kevin Hurley
*Attorney, Agent, or Firm*—Merchant, Gould, Smith, Edell, Welter & Schmitd

[57] ABSTRACT

An electrically operated power steering apparatus for use in a motor vehicle includes a steering shaft axially movable in response to a manual steering force applied from a steering wheel, the steering shaft having a ball screw, a nut screw threaded over the ball screw with a plurality of balls interposed therebetween, a brushless motor for assisting in axially moving the steering shaft, the brushless motor having a rotor coupled to the nut screw and rotatably disposed around the steering shaft, and a stator spaced from the rotor by a first gap, an outer casing having a first inner circumferential surface which supports the nut screw through a bearing, a second circumferential surface which supports the stator, and an adjacent portion disposed adjacent to the brushless motor remote from the nut screw, the steering shaft being housed in the outer casing, and a power device disposed in the adjacent portion closely to the stator and electrically connected to the stator.

14 Claims, 13 Drawing Sheets

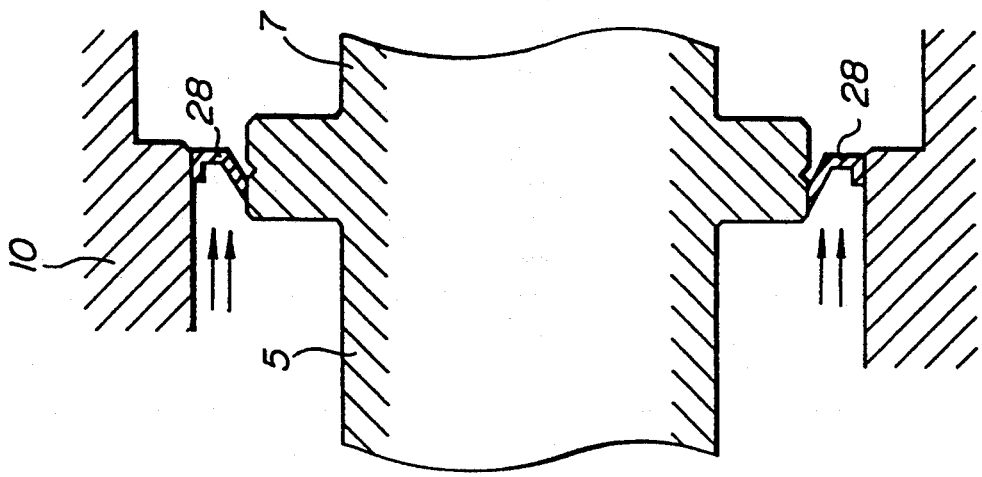
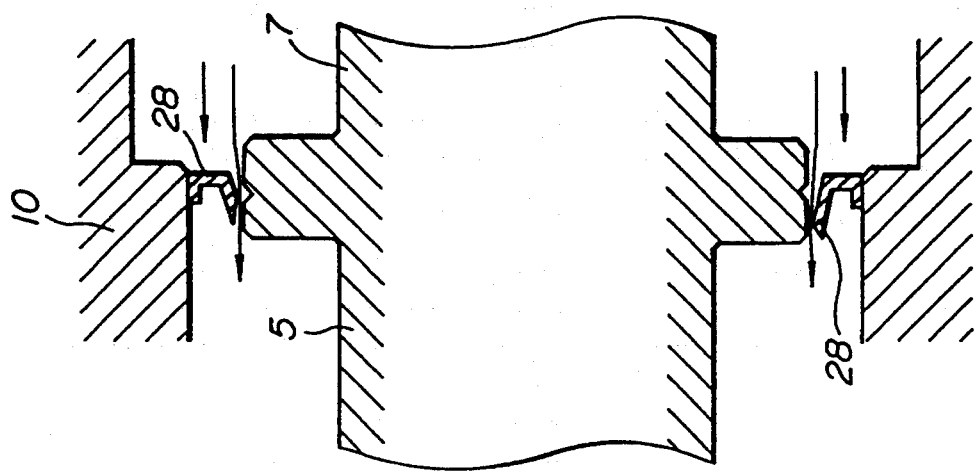

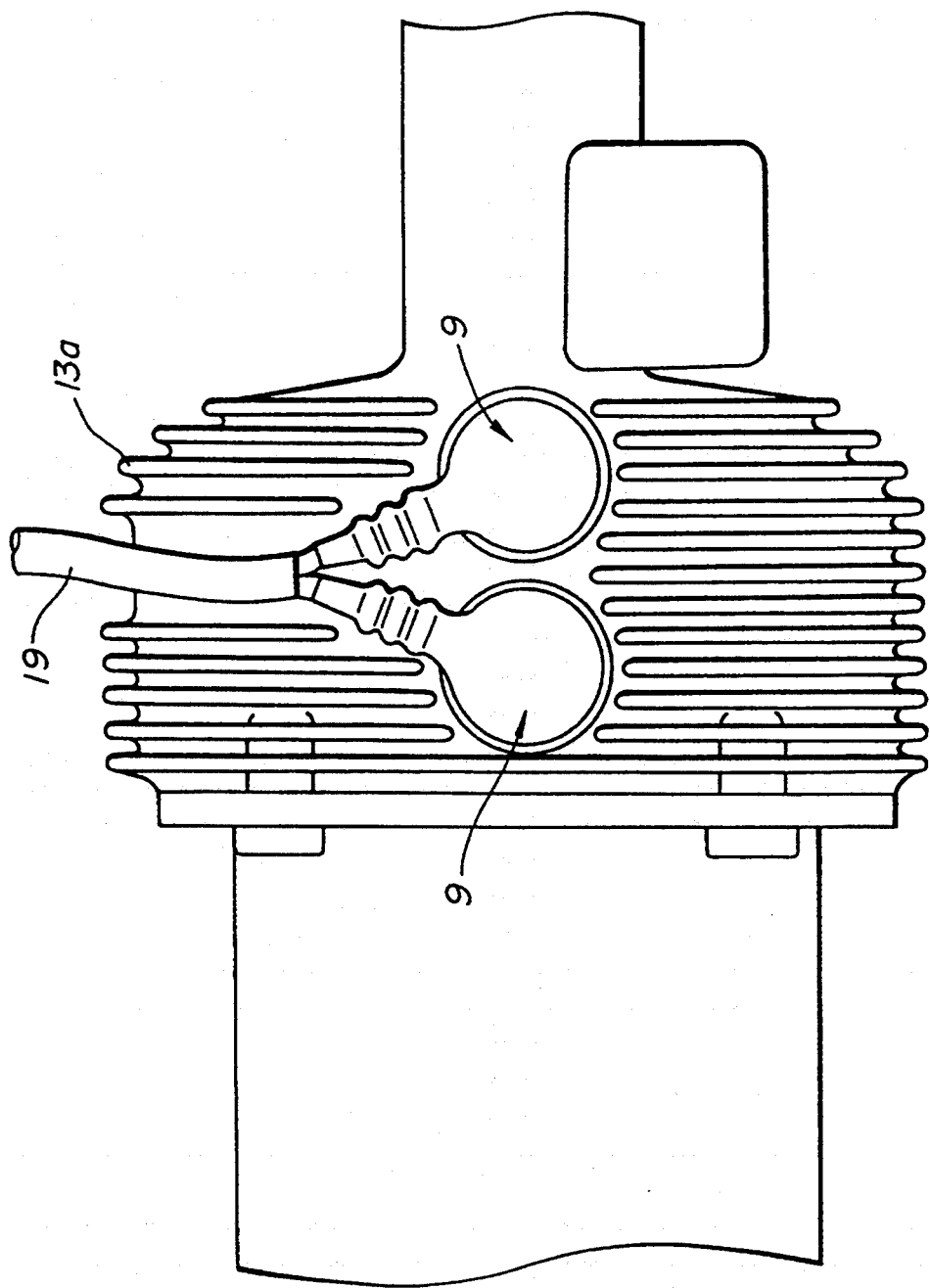

ELECTRICALLY OPERATED POWER STEERING APPARATUS

BACKGROUND OF THE INVENTION

1. Field of the Invention

The present invention relates to an electrically operated power steering apparatus for producing assistive steering forces to assist the driver of a motor vehicle in steering the motor vehicle.

2. Description of the Prior Art

One known electrically operated power steering apparatus which employs an electric motor to assist in steering a motor vehicle is disclosed in Japanese laid-open patent publication No. 3-7661, for example. The disclosed electrically operated power steering apparatus includes a power circuit spaced from the electric motor and connected to the field coil of the stator of the electric motor by long motor wires.

Generally, electrically operated power steering apparatus on motor vehicles detect a manual steering force from a steering wheel with a torque sensor, energize a brushless motor with a detected signal from the torque sensor, and converts the rotation of the brushless motor into linear movement of a steering shaft for producing an assistive force to be added to the manual steering force to steer the motor vehicles. For example, a conventional electrically operated power steering apparatus shown in FIG. 14(b) of the accompanying drawings has a torque sensor that supplies a detected signal to a central processing unit (CPU), which applies a control signal to a motor control circuit that controls a power circuit to energize a brushless motor. The power circuit comprises a plurality of power devices which are typically metal-oxide-semiconductor field-effect transistors (MOS-FETs).

Heretofore, the power circuit is included in a control unit which is positioned separately from the brushless motor. Therefore, power lines or electric wires connecting the power circuit to the stator of the brushless motor are exposed therebetween and relatively long. The long electric wires cause a large resistance-induced energy loss, and tend to produce noise impairing the function of the power devices of the power circuit because of high-speed switching of large currents flowing through the electric wires.

One solution would be to minimize the length the electric wires connecting the power circuit to the brushless motor. If the electric wires were shortened, then the power devices would have to be positioned closely to the stator of the brushless motor. Since the power devices are susceptible to heat, it would be necessary to rely on some measures to radiate the heat that is generated by the stator as well as the heat generated by the power devices themselves.

SUMMARY OF THE INVENTION

It is therefore an object of the present invention to provide an electrically operated power steering apparatus which has relatively short electric wires interconnecting a power circuit and an electric motor to allow the power circuit to perform its function reliably.

According to the present invention, there is provided an electrically operated power steering apparatus, comprising a steering shaft axially movable in response to a manual steering force applied from a steering wheel, the steering shaft having a ball screw, a nut screw threaded over the ball screw with a plurality of balls interposed therebetween, a brushless motor for assisting in axially moving the steering shaft, the brushless motor having a rotor coupled to the nut screw and rotatably disposed around the steering shaft, and a stator spaced from the rotor by a first gap, an outer casing having a first inner circumferential surface which supports the nut screw through a bearing, a second circumferential surface which supports the stator, and an adjacent portion disposed adjacent to the brushless motor remote from the nut screw, the steering shaft being housed in the outer casing, and a power device disposed in the adjacent portion closely to the stator and electrically connected to the stator.

The adjacent portion may have a third circumferential surface defining a cavity between itself and an outer circumferential surface of the steering shaft, the power device being mounted on the third circumferential surface and exposed in the cavity for effectively dissipating heat generated by the power device.

The rotor may have an inner circumferential surface spaced from the outer circumferential surface of the steering shaft by a second gap, and an extension extending into the cavity and defining the cavity between itself and the third circumferential surface of the adjacent portion, the extension having a fin on an outer circumferential surface thereof for applying air to the power device upon rotation of the rotor for effectively dissipating heat generated by the power device. The extension may have a tubular shape disposed around and spaced from the steering shaft by a third gap, the extension having a plurality of fins mounted at angularly spaced intervals on the outer circumferential surface thereof, and a plurality of air passages defined through the outer circumferential surface thereof and communicating between the third gap and the cavity.

Each of the fins may have a slanted surface which is progressively lower toward the brushless motor, and/or may be progressively thinner toward the brushless motor. The extension may have a flange projecting radially outwardly from outer circumferential surface thereof and interconnecting the fins at ends thereof remote from the brushless motor for directing air more effectively.

The electrically operated power steering apparatus may further comprise a first check valve interposed between the first inner circumferential surface of the outer casing and an outer circumferential surface of a junction between the rotor and the nut screw, for allowing an air flow from the cavity through the first gap toward the bearing. Such air circulation is effective to cool the power device and also the brushless motor.

The electrically operated power steering apparatus may further comprise an electric power connector disposed on an outer surface of the adjacent portion of the outer casing and electrically connected to the power device, and a plurality of heat radiating fins projecting from the outer surface of the adjacent portion in surrounding relationship to the electric power connector for increased heat radiation.

Where the electrically operated power steering apparatus is incorporated in a motor vehicle having a pair of axles, the adjacent portion may be disposed between the axles for receiving ram air while the motor vehicle is running for increased heat radiation. The steering shaft may have opposite ends connected to respective tie rods of the motor vehicle, and the electrically operated power steering apparatus may further comprise a pair of extensible and contractible boots interconnecting the tie rods and respective ends of the outer casing, the adjacent portion having a fourth inner circumferential surface spaced from the outer circumferential surface of the steering shaft by a fourth gap, one of the boots being held in communication with the cavity through the fourth gap, the third gap, and the air passages. The electrically operated power steering apparatus may further comprise a second check valve interposed between the inner circumferential surface of the rotor and the outer circumferential surface of the steering shaft, for allowing an air flow from the second gap toward the third gap, the other of the boots being held in communication with the cavity through the nut screw, the second gap, the second check valve, the third gap, and the air passages.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIGS. 7(a) and 7(b) are cross-sectional views showing operation of a check valve interposed between a first housing and a nut screw in the electrically operated power steering apparatus shown in FIG. 1;

FIG. 8 is an elevational view of heat radiating fins and electric power connectors on an outer surface of a third housing in the electrically operated power steering apparatus shown in FIG. 1;

DETAILED DESCRIPTION OF THE PREFERRED EMBODIMENTS

The principles of the present invention are useful when embodied in an electrically operated power steering apparatus on a motor vehicle in which a brushless motor is energized by various control signals including a detected signal from a torque sensor, and the rotation of the brushless motor is converted into linear movement of a steering shaft for producing an assistive force to be added to the manual steering force to steer the motor vehicle.

Figure 1:
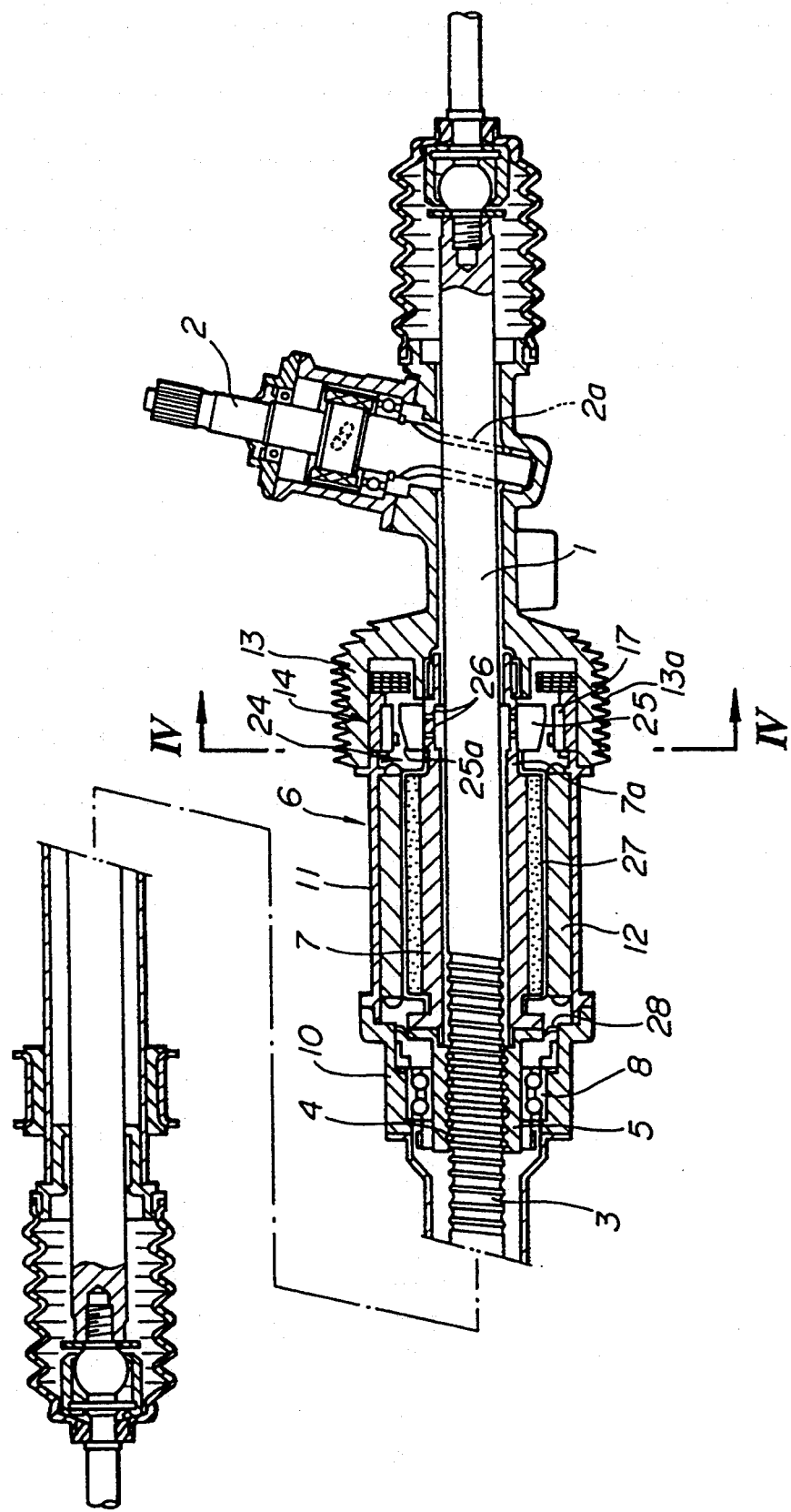
FIG. 1 is a fragmentary cross-sectional view of an electrically operated power steering apparatus according to a first embodiment of the present invention.

FIG. 1 shows an electrically operated power steering apparatus according to a first embodiment of the present invention. As shown in FIG. 1, the electrically operated power steering apparatus has a steering shaft 1 reciprocally movable linearly in an outer casing and having a rack (not shown) on its back which is held in mesh with a pinion 2a mounted on the lower end of a steering column 2 coupled to a steering wheel (see FIG. 9). Therefore, rotation of the steering wheel can be converted into linear axial movement of the steering shaft 1. The steering shaft 1 also includes a ball screw 3 on its outer circumferential surface remote from the rack, and a nut screw 5 is threaded over the ball screw 3 through a plurality of balls 4 therebetween. The nut screw 5 can be rotated to assist in linearly moving the steering shaft 1 in its axial direction.

The nut screw 5 has an axial end fastened as by bolts to a rotor 7 of a brushless motor 6 which is positioned adjacent to the nut screw 5. The nut screw 5 is rotatably supported in a first housing 10 of the outer casing by a bearing 8.

The brushless motor 6 comprises a rotor 7 housed in a second housing 11 of the outer casing and rotatably disposed around the steering shaft 1, a permanent magnet 27 fixedly mounted on the outer circumferential surface of the rotor 7, and a stator 12 fixedly housed in the second housing 11 around the permanent magnet 27 on the rotor 7 in radially spaced relationship thereto, the stator 12 comprising a coil winding disposed on the inner circumferential surface of the second housing 11. The brushless motor 6 can be energized by a power circuit unit 14 that is housed in a third housing of the outer casing which is disposed adjacent to the second housing 11. The power circuit unit 14 has terminals electrically connected to winding terminals 15 (see FIG. 2) of the stator 12.

Figure 2:
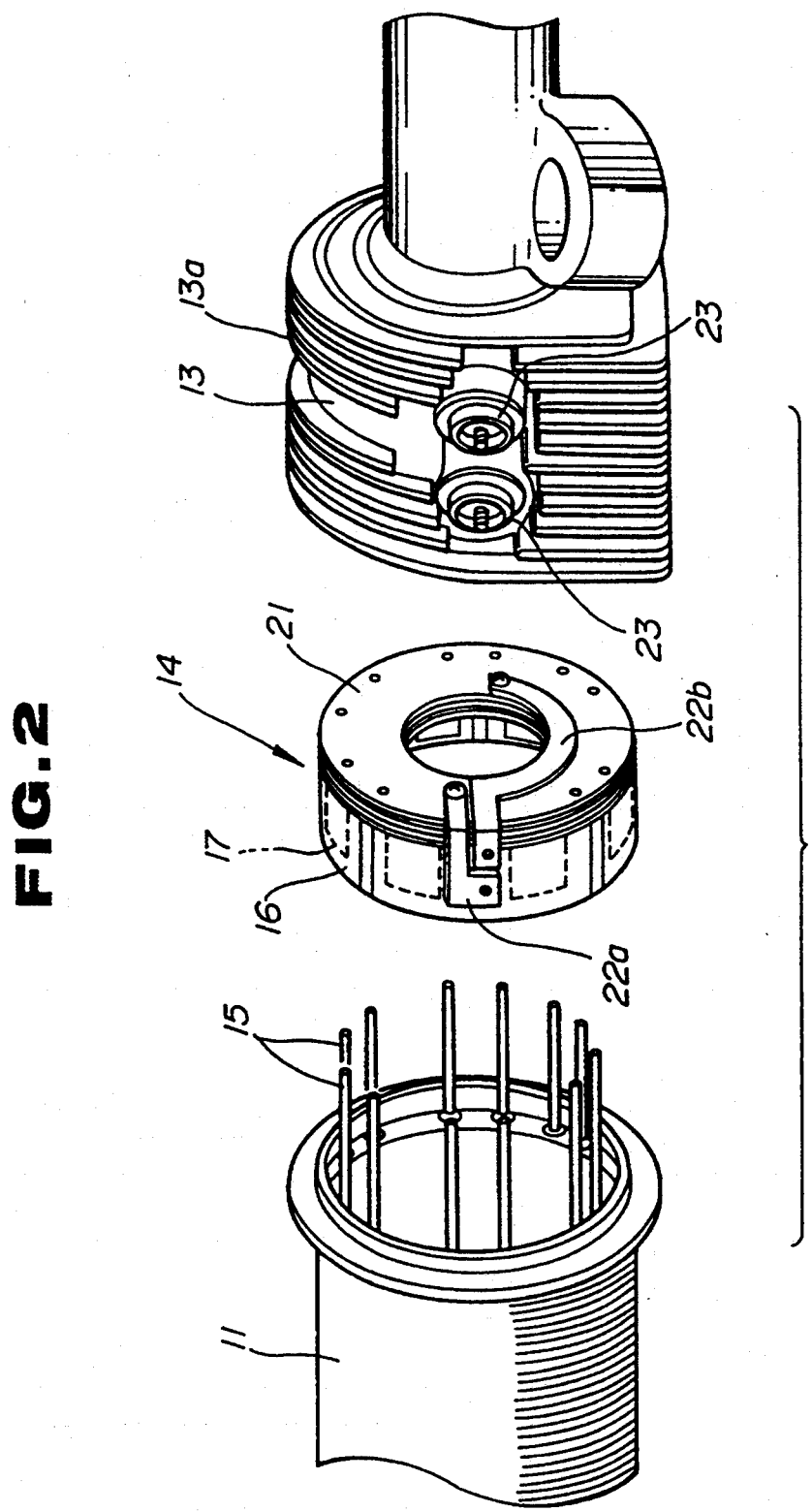
FIG. 2 is an exploded perspective view of a portion of the electrically operated power steering apparatus shown in FIG. 1.
Figure 3:
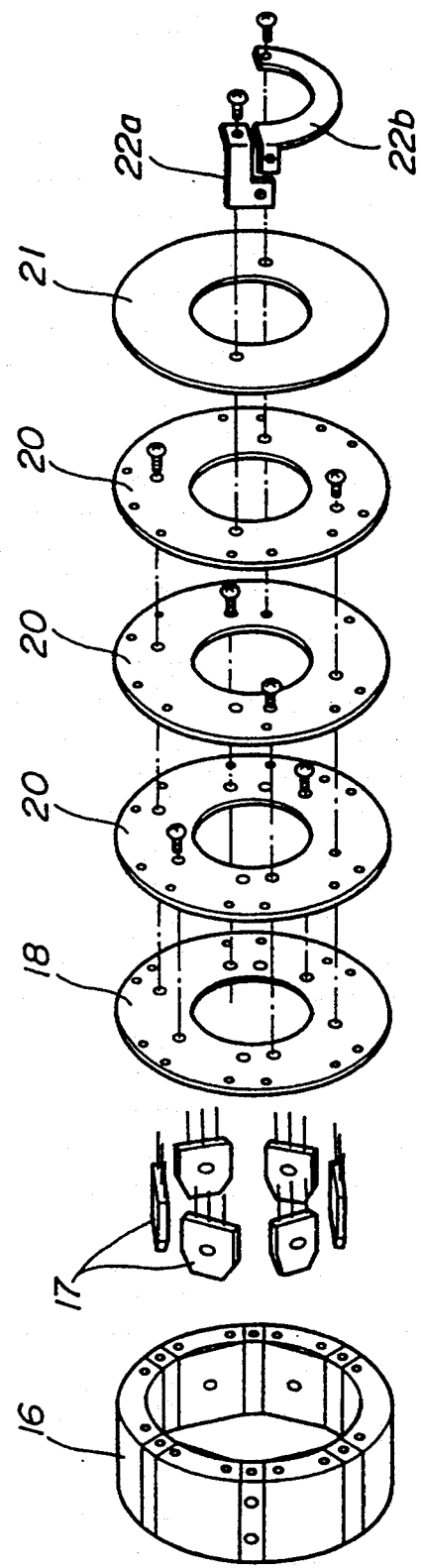
FIG. 3 is an exploded perspective view of a power circuit unit of the electrically operated power steering apparatus shown in FIG. 1.
Figure 4:
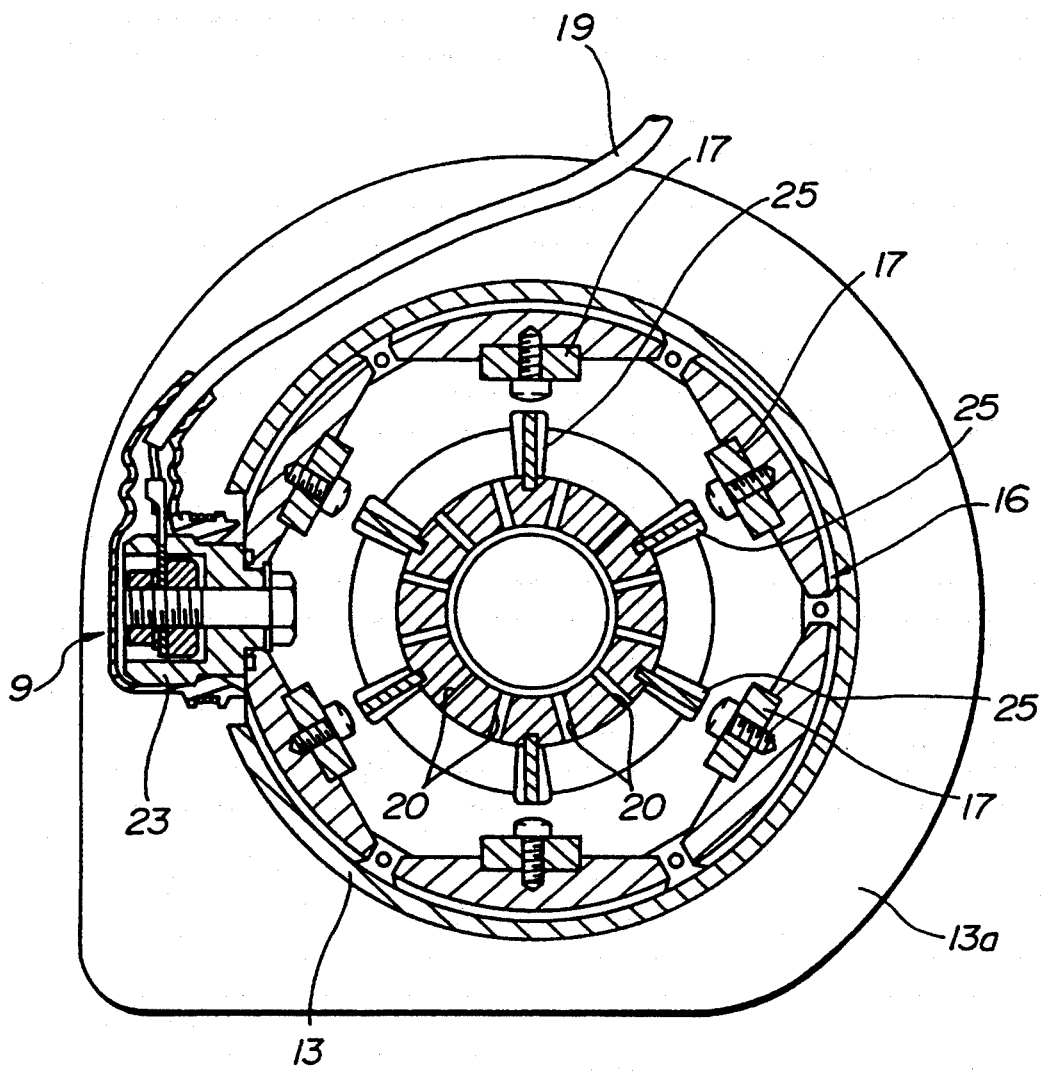
FIG. 4 is a cross-sectional view taken along line IV—IV of FIG. 1.

As shown in FIG. 3, the power circuit unit 14 comprises a cylindrical base block 16, a plurality of power devices 17 fixedly mounted on the inner circumferential surface of the base block 16, a thin annular circuit board 18 electrically connected to the power devices 17, an annular power supply board 21 attached to the circuit board 18 through a plurality of annular connector boards 20, and fastening members 22a, 22b fastening the stacked annular boards 18, 20, 21 to an axial end of the base block 16. The power devices 17 may comprise metal-oxide-semiconductor field-effect transistors (MOS-FETs), for example, and are positioned adjacent to the stator 12. As shown in FIG. 4, there are six power devices 17 mounted at circumferentially equally spaced intervals on the inner circumferential surface of the base block 16. The power devices 17 are electrically connected through the boards 18, 20, 21 to electric power connectors 9 in respective joints 23 on the outer circumferential surface of the third housing 13 as shown in FIG. 2. The electric power connectors 9 are supplied with electric energy from a battery 29 (see FIG. 9) through electric wires 19.

If the power devices 17 comprise MOS-FETs, then their characteristics will be linearly deteriorated, i.e., their allowable loss will be lowered, at temperatures higher than 30° C., and they will almost fail to operate at 150° C. To avoid such a malfunction, the third housing 13 has a number of heat radiating fins 13a on its outer circumferential surface for radiating the heat generated in and applied to the power circuit unit 14. As shown in FIG. 8, the heat radiating fins 13a are positioned around the electric power connectors 9. As shown in FIG. 4, the electric power connectors 9 are mounted in a recess defined in the third housing 13 and have respective outer ends lower than the radially outer ends of the heat radiating fins 13a. The electric power connectors 9 are protected by the surrounding heat radiating fins 13a, and the electric wires 19 connected to the electric power connectors 9 are also protected as they extend between some of the heat radiating fins 13a.

As shown in FIG. 1, the rotor 7 has an axial end extending into the third housing 13. The axial end of the rotor 7 which extends into the third housing 13 is in the form of a smaller-diameter tubular portion 7a which allows a large cavity 24 to be defined in the third housing 13.

Figure 5:
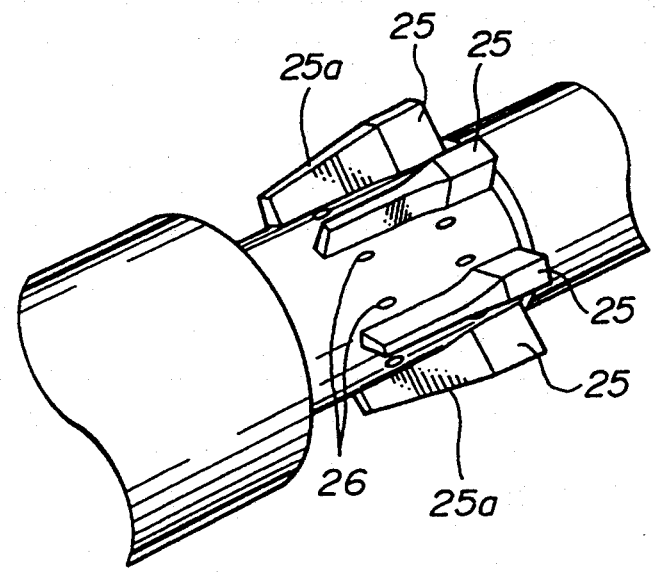
FIG. 5 is a fragmentary perspective view of fins on an extension of a rotor in the electrically operated power steering apparatus shown in FIG. 1.

As shown in FIGS. 1 and 5, a plurality of fins 25 are mounted at angularly spaced intervals on the outer circumferential surface of the smaller-diameter tubular portion 7a. Each of the fins 25 extends in the axial direction of the steering shaft 1, and has a slanted radially outer surface 25a that is progressively lower toward, or progressively higher away from, the second housing 11 or the brushless motor 6. When the rotor 7 rotates, the fins 25 produce and direct an air flow obliquely toward the power devices 17. At this time, the slanted radially outer surface 25a is effective to direct the air flow from the right to the left in FIG. 1. The smaller-diameter tubular portion 7a has a plurality of air passages 26 defined radially therethrough between the fins 25. Air is introduced from an annular gap defined between the steering shaft 1 and the rotor 7 into the cavity 24 through the air passages 26, and also from an annular gap defined between the steering shaft 1 and the third housing 13, on the right-hand side of the cavity 24 in FIG. 1, into the cavity 24 through the air passages 26. The introduced air is applied to the power devices 17 by rotation of the fins 25.

As shown in FIG. 5, each of the fins 25 is progressively tapered or thinner toward the second housing 11 or the brushless motor 6 for effectively directing the air flow from the right to the left in the axial direction of the steering shaft 1.

Figure 6:
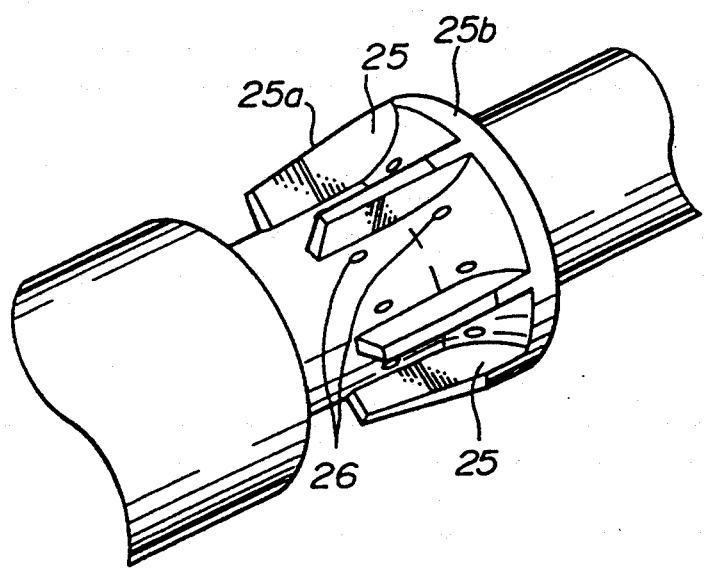
FIG. 6 is a fragmentary perspective view of modified fins on an extension of a rotor in the electrically operated power steering apparatus shown in FIG. 1.

FIG. 6 shows modified fins 25 having ends remote from the second housing 11 or the brushless motor 6 which are interconnected by a flange 25b projecting radially outwardly from the smaller-diameter portion 7a. The flange 25b has a slanted radially outward surface for more effectively directing the air flow obliquely radially outwardly toward the power devices 17.

As shown in FIG. 1, a check valve 28 is disposed in a boundary region axially between the first housing 10 and the second housing 11. The check valve 28 can cut off an air passage between a space within the first housing 10 and a space around an end of the rotor 7 where the nut screw 5 extends. When air flows from the power devices 17 in the cavity 24, the check valve 28 is opened to allow such an air flow therethrough as shown in FIG. 7(b). When air flows in the opposite direction, i.e., from within the first housing 10, the check valve 28 is closed to block such an air flow as shown in FIG. 7(a).

There are two air passages defined around the nut screw 5, i.e., an outer air passage extending through the bearing 8 and an inner air passage extending through the nut screw 5 threaded over the ball screw 3.

As shown in FIG. 1, there is a small annular gap created between the permanent magnet 27 on the rotor 7 in the second housing 11 and the stator 12 in the second housing 11.

Figure 14A:
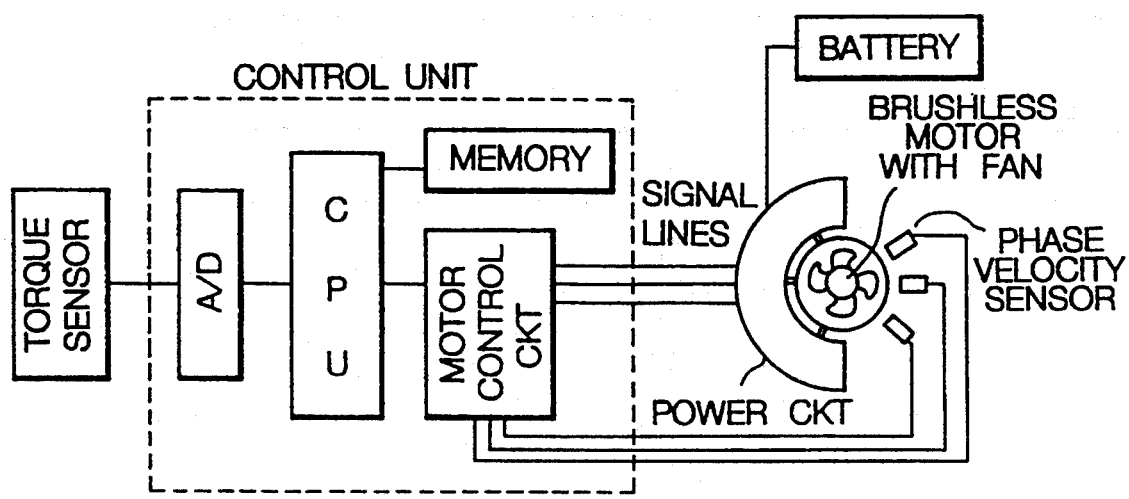
FIG. 14(a) is a block diagram of a system arrangement of the electrically operated power steering apparatus shown in FIGS. 1 and 10.
Figure 14B:
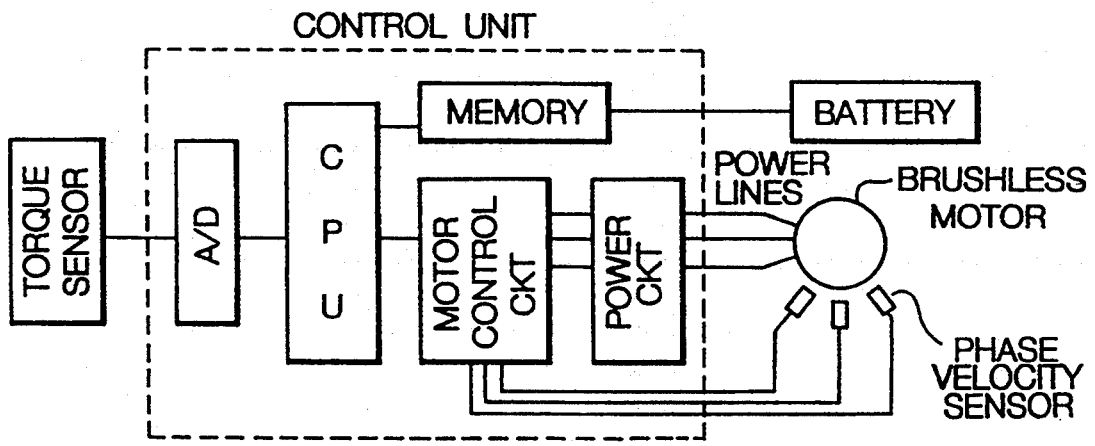
FIG. 14(b) is a block diagram of a system arrangement of a conventional electrically operated power steering apparatus.

The electrically operated power steering apparatus described above has a system arrangement as shown in FIG. 14(a). The control circuit unit 14 shown in FIG. 1, particularly, the power devices 17 thereof, are controlled by a control unit shown in FIG. 14(a) which is labeled as an ECU in FIG. 9.

Figure 9:
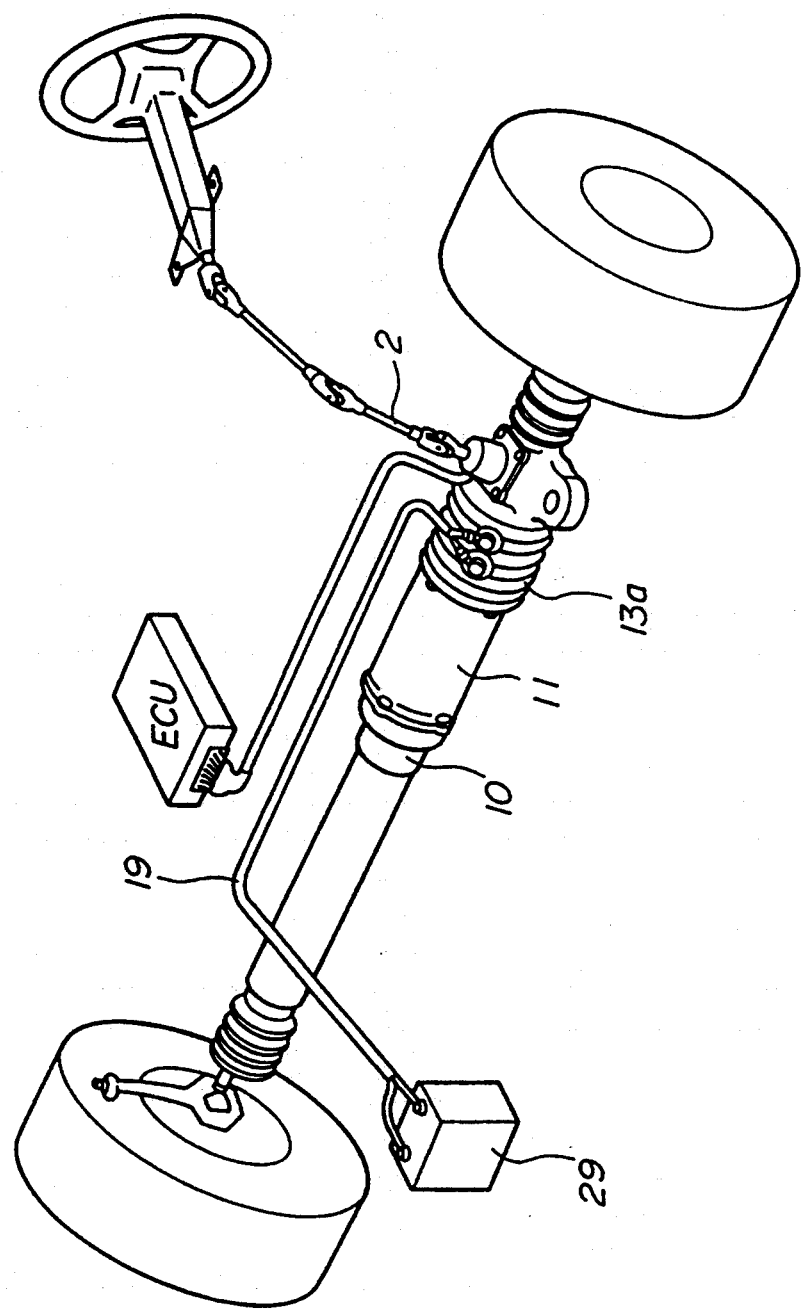
FIG. 9 is a perspective view of the electrically operated power steering apparatus shown in FIG. 1 as it is incorporated in a motor vehicle.

When the nut screw 5 is rotated by the rotor 7 that is rotated based on a detected signal from the torque sensor which detects a manual steering force applied to the steering wheel, the steering shaft is linearly moved in its axial direction thereby assisting in steering the motor vehicle. At this time, the heat generated by the power devices 17 can effectively be dissipated. More specifically, when the rotor 7 is rotated by a current supplied from the power devices 17 to the stator 12, the fins 25 on the smaller-diameter portion 7a of the rotor 7 apply air to the power devices 17, and send air out of the cavity 24 through the gap between the permanent magnet 27 and the stator 12 and the check valve 28 toward the bearing 8. Therefore, the heat generated by the power devices 17 can efficiently be discharged through the gaps of the bearings 8. At this time, new air is introduced from the gap between the steering shaft 1 and the rotor 7 and the gap between the steering shaft 1 and the third housing 13 into the cavity 24 through the air passages 26. The heat generated by the power devices 17 is also transferred to the heat radiating fins 13a on the third housing 13. Since the heat radiating fins 13a are positioned between the axles of steerable road wheels as shown in FIG. 9, ram air produced when the motor vehicle is running is applied directly to the heat radiating fins 13a for thereby effectively dissipating the heat from the heat radiating fins 13a.

An electrically operated power steering apparatus according to a second embodiment of the present invention will be described below with reference to FIGS. 10 through 13. The electrically operated power steering apparatus according to the second embodiment is essentially the same as the electrically operated power steering apparatus according to the first embodiment in that the stator 12 and the power devices 17 are positioned adjacent to each other. However, the electrically operated power steering apparatus according to the second embodiment is arranged to dissipate more efficiently the heat generated by the power devices 17 and the heat generated by the brushless motor 6, particularly, the stator 12 thereof. Those parts shown in FIGS. 10 through 13 which are identical to those shown in FIGS.

1 through 9 are denoted by identical reference numerals.

Figure 10:
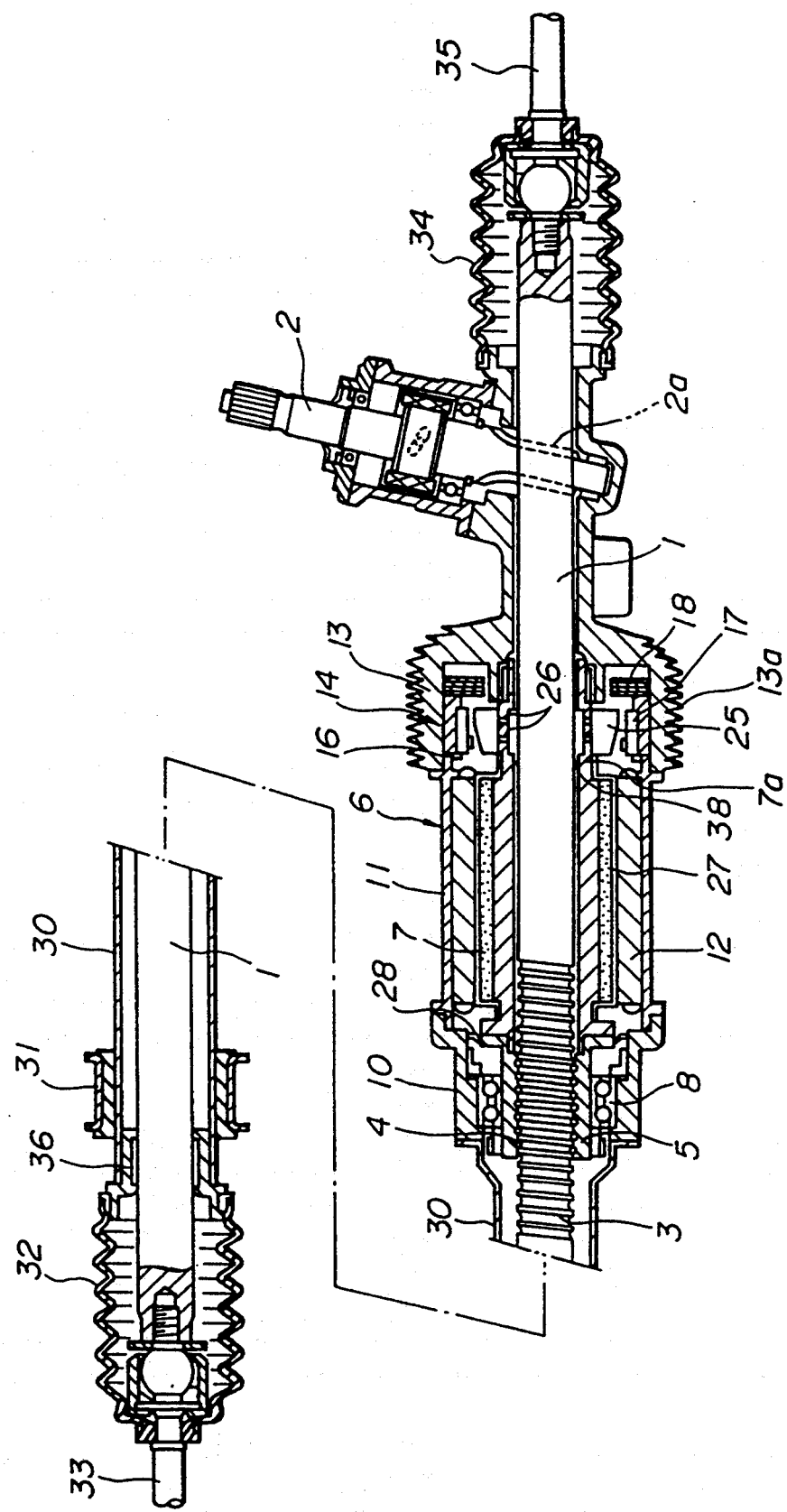
FIG. 10 is a fragmentary cross-sectional view of an electrically operated power steering apparatus according to a second embodiment of the present invention.

As shown in FIG. 10, the outer casing for the steering shaft 1 also has a fourth housing 30 extending leftward from the brushless motor 6 and supported by a bracket 31. The fourth housing 30 has an end connected to an end of an extensible and contractible boot 32 whose other end is coupled to a tie rod 33.

The end of the third housing 13 remote from the second housing 11 is connected to an end of an extensible and contractible boot 34 whose other end is coupled to a tie rod 35.

The boot 32, the fourth housing 30, the brushless motor 6, the third housing 13, and the boot 34 are held in successive communication with each other.

Specifically, the above gap is defined between the third housing 13 and the steering shaft 1, and there is a clearance between the fourth housing 30 and the steering shaft 1 for allowing the steering shaft 1 to move linearly axially.

Figure 13:
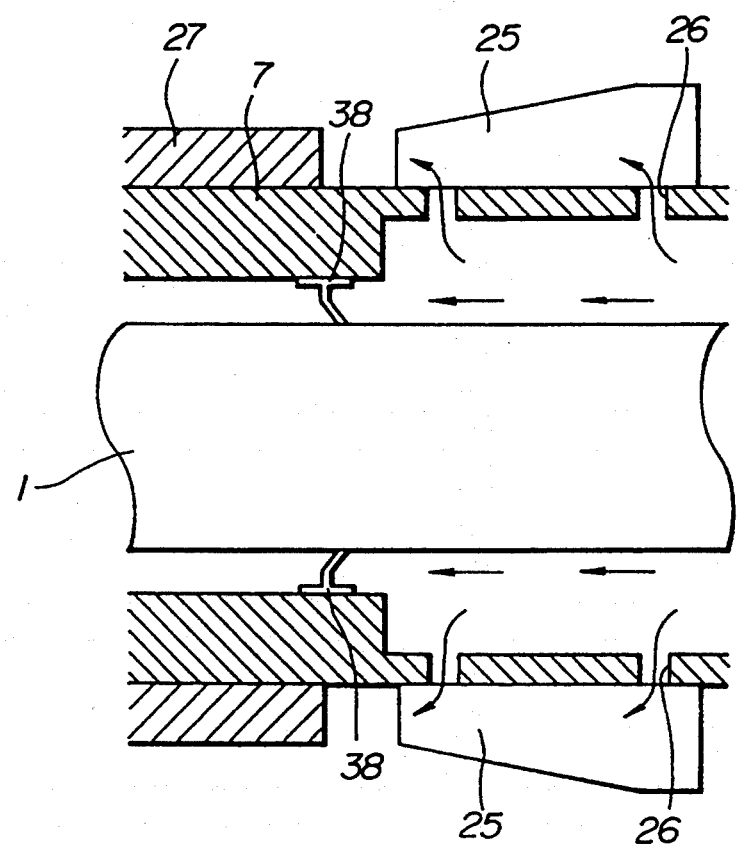
FIG. 13 is a cross-sectional view showing operation of a check valve interposed between a rotor and a steering shaft in the electrically operated power steering apparatus shown in FIG. 10.

Therefore, the interior spaces of the boot 32, the fourth housing 30, the brushless motor 6, the third housing 13, and the boot 34 communicate with each other through those gaps or clearances as air passages. According to the second embodiment, a check valve 38 is also disposed between the end of the rotor 7 near the fins 25 and the steering shaft 1, in addition to the check valve 28 which operates as shown in FIGS. 7(a) and 7(b). As shown in FIG. 13, the check valve 38 prevents air from flowing from the right, i.e., from the space within the smaller-diameter tubular portion 7a toward the gap between the steering shaft 1 and the rotor 7, and allows air from flowing from the left, i.e., from the gap between the steering shaft 1 and the rotor 7 toward the space within the smaller-diameter tubular portion 7a.

The boot 32 shown in FIG. 10 is connected to the fourth housing 30 by a joint 36 which has a plurality of, e.g., four, air bleeding holes defined therein at circumferentially spaced intervals.

Air cooling action of the electrically operated power steering apparatus according to the second embodiment will be described below.

When the steering wheel is turned, the torque sensor produces a detected signal, and various control signals are generated to cause the brushless motor 6 to generate assistive steering forces. Specifically, a current is supplied to the stator 12 of the brushless motor 6 from the power devices 17 of the power circuit unit 14, thereby rotating the rotor 7 to move the steering shaft 1 linearly in its axial direction thereby assisting in steering the motor vehicle.

Figure 11:
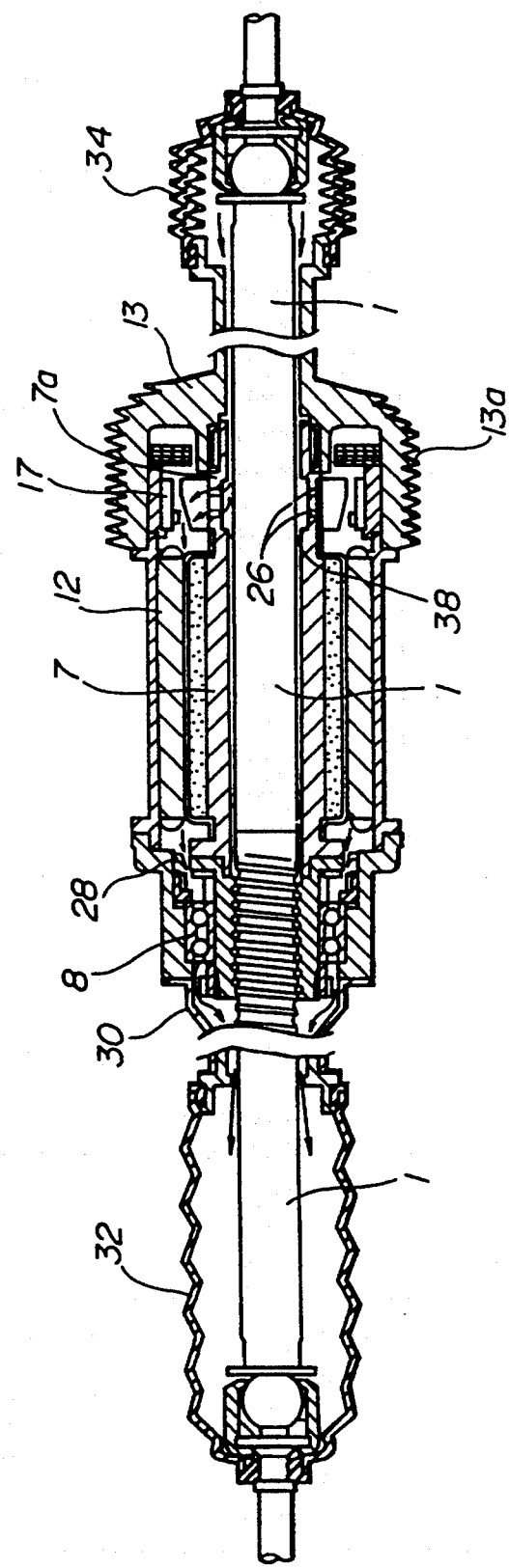
FIG. 11 is a fragmentary cross-sectional view of the electrically operated power steering apparatus shown in FIG. 10 as it is operated to steer a motor vehicle in one direction.

If the steering shaft 1 is axially moved to the right as shown in FIG. 11, then the right-hand boot 34 is contracted and the left-hand boot 32 is extended. Air in the boot 34 is compressed and is caused to flow in the direction indicated by the arrows toward the boot 32 in which a negative pressure is developed. Since the air passage between the rotor 7 and the steering shaft 1 is closed by the check valve 38, the air flows through the gap between the third housing 13 and the steering shaft 1 and is introduced through the air passages 26 and applied to the power devices 17. After having cooled the power devices 17, the air flows through the gap between the rotor 7 and the stator 12 thus cooling the stator 12. After having cooled the stator 12, the air flows through the check valve 28 and the bearing 8 into the clearance between the fourth housing 30 and the steering shaft 1, from which the air enters the boot 32.

The air which has been heated by cooling the power devices 17 and the stator 12 is cooled while flowing through the check valve 28 and the bearing 8 into the clearance between the fourth housing 30 and the steering shaft 1.

Figure 12:
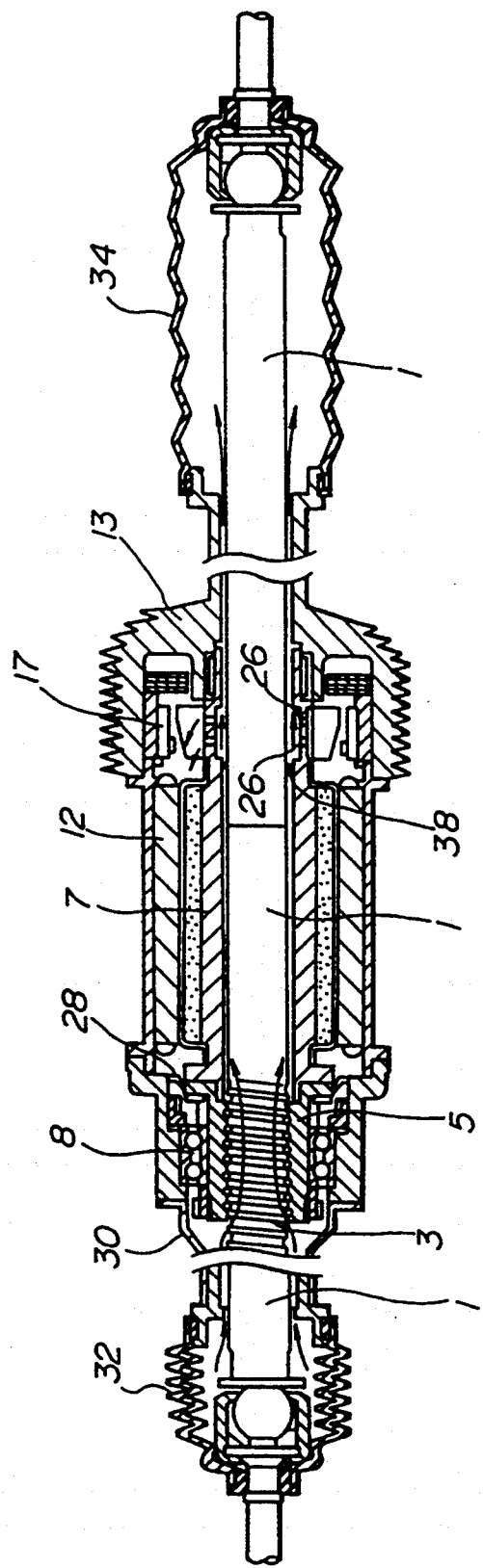
FIG. 12 is a fragmentary cross-sectional view of the electrically operated power steering apparatus shown in FIG. 10 as it is operated to steer a motor vehicle in an opposite direction.

If the steering shaft 1 is axially moved to the left as shown in FIG. 12, then the left-hand boot 32 is contracted and the right-hand boot 34 is extended. Air in the boot 32 is compressed and is caused to flow in the direction indicated by the arrows toward the boot 34 in which a negative pressure is developed. Since the air flowing through the clearance between the fourth housing 30 and the steering shaft 1 and also through the bearing 8 is blocked by the check valve 28, the air flows through the gap between the nut screw 5 and the ball screw 3 into the gap between the rotor 7 and the steering shaft 1, and then flows through the check valve 38. The air is partly drawn through the air passages 26 to cool the power devices 17 and the stator 12, and partly enters the boot 34.

According to the second embodiment, when the steering shaft 1 is axially moved, the boots 32, 34 are expanded and contracted to circulate air to cool the power devices 17 and the brushless motor 6, particularly its stator 12 highly effectively. Consequently, the power devices 17 that are positioned closely to the brushless motor 6, which generates heat in operation, are effectively cooled and free of heat-induced problems.

With the electrically operated power steering apparatus according to the present invention, the power devices 17 are positioned in the third housing 13 of the outer casing for the steering shaft 1 closely to the stator 12 of the brushless motor 6, so that any electric wires interconnecting the power devices 17 and the stator 12 are shortened. Since such electric wires are not required to be unduly long, any resistance-induced energy loss caused thereby is small, and the electric wires minimize noise, thus allowing the power devices 17 to perform their function reliably. Inasmuch as the power circuit unit 14 including the power devices 17 is mounted in the third housing 13, the overall size of the electrically operated power steering apparatus is reduced, and so is the weight thereof. Because the power devices 17 are exposed in the cavity 24 and supplied with air from the fins 25 on the rotor 7 upon rotation of the rotor 7, the heat generated by the power devices 17 can effectively be dissipated. The electric power connectors 9 are mounted on the outer surface of the third housing 13 and surrounded by the heat radiating fins 13a. Consequently, any electric wires connected between the electric power connectors 9 and the power devices 17 are simplified, permitting the battery and the control unit to be arranged with greater freedom. The heat radiating fins 13a are effective to cool the power devices 17, which are allowed to function reliably without fail. The cooling capability of the heat radiating fins 13a can be increased by ram air if they are positioned between the axles of the steerable road wheels.

Circulating air may be produced by the boots 32, 34 as they are extended and contracted upon linear axial movement of the steering shaft 1 for more effectively cooling the power devices 17 and the brushless motor 6, particularly, the stator 12 thereof. Accordingly, the power devices 17 may be positioned as closely to the brushless motor 6 as possible.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. An electrically operated power steering apparatus, comprising:
   a steering shaft axially movable in response to a manual steering force applied from a steering wheel, said steering shaft having a ball screw;
   a nut screw threaded over said ball screw with a plurality of balls interposed therebetween;
   a brushless motor for assisting in axially moving said steering shaft, said brushless motor having a rotor coupled to said nut screw and rotatably disposed around said steering shaft, and a stator having winding terminals;
   an outer casing having a first inner circumferential surface which supports said nut screw through a bearing, a second circumferential surface which supports said stator, and an adjacent portion disposed adjacent to said brushless motor remote from said nut screw;
   a power circuit unit including a power device disposed in said adjacent portion closely to said stator, said power circuit unit having terminals electrically connected to the winding terminals of said stator;
   a torque sensor;
   means for controlling said brushless motor and said power circuit unit, said controlling means being in electrical communication with said torque sensor; and
   means for providing power to said power circuit unit.

2. An electrically operated power steering apparatus according to claim 1, wherein said adjacent portion has a third circumferential surface forming interior from said third circumferential surface a cavity, said power device being mounted on said third circumferential surface and exposed in said cavity.

3. An electrically operated power steering apparatus according to claim 2, wherein said rotor has an extension extending into said cavity, said extension having a fin on an outer circumferential surface thereof for applying air to said power device upon rotation of said rotor.

4. An electrically operated power steering apparatus according to claim 3, wherein said extension has an outer circumferential surface, said apparatus further comprising a cylindrical base block having an inner circumferential surface which defines said cavity between the inner circumferential surface and the outer circumferential surface of said extension, said cylindrical base block also having a side surface supporting a stack of annular circuit boards thereon which are electrically connected to said power device, said power device being fixedly mounted to said cylindrical base block, said cylindrical base block having an outer circumferential surface fitted in the third circumferential surface of said adjacent portion.

5. An electrically operated power steering apparatus according to claim 3, wherein said fin has a slanted surface which is progressively lower toward said brushless motor.

6. An electrically operated power steering apparatus according to claim 3, wherein said fin is progressively thinner toward said brushless motor.

7. An electrically operated power steering apparatus according to claim 3, wherein said extension has a flange projecting radially outwardly from the outer circumferential surface thereof and interconnecting said fins at ends thereof remote from said brushless motor.

8. An electrically operated power steering apparatus according to claim 1, further comprising an electric power connector disposed on an outer surface of said adjacent portion of said outer casing and electrically connected to said power device, and a plurality of heat radiating fins projecting from the outer surface of said adjacent portion in surrounding relationship to said electric power connector.

9. An electrically operated power steering apparatus according to claim 8, in a motor vehicle having a pair of axles, wherein said adjacent portion is disposed between said axles for receiving ram air while the motor vehicle is running.

10. An electrically operated power steering apparatus for a motor vehicle, comprising:
    a power steering assembly including a steering shaft, a brushless motor with a rotor and a stator, and an outer casing cylindrically fitted about said steering shaft and having a circumferential surface for supporting said stator, said outer casing including an adjacent portion relative to said motor, said adjacent portion forming a cavity, said assembly further including a power circuit unit having a power device mounted in said cavity to said adjacent portion, said power device producing heat; and
    means for dissipating the heat produced by said power device, said dissipating means including means for ramming air along said steering shaft and circulating the air passed said power device.

11. An electrically operated power steering apparatus according to claim 10, wherein said air circulating and ramming means includes first, second and third gaps, stator being spaced from said rotor by a first gap, said rotor having an inner circumferential surface spaced from said steering shaft by a second gap, said rotor having an extension extending into said cavity, said extension having a tubular shape disposed around and spaced from said steering shaft by a third gap, said extension also having a plurality of fins mounted at angularly spaced intervals on the outer circumferential surface thereof, and a plurality of air passages defined through the outer circumferential surface thereof and communicating between said third gap and said cavity, said fins circulating air flowing through said third gap about said cavity.

12. An electrically operated power steering apparatus according to claim 11, wherein said steering shaft includes a ball screw and said assembly further includes a nut screw threaded over said ball screw with a plurality of balls therebetween, said nut screw being support by said outer casing with a bearing, said assembly further comprising a first check valve interposed between said circumferential surface of said outer casing and an outer circumferential surface of a junction between said rotor and said nut screw, for allowing an air flow from said cavity through said first gap toward said bearing.

13. An electrically operated power steering apparatus according to claim 12, in a motor vehicle having a pair of tie rods, wherein said steering shaft has opposite ends connected to said tie rods, respectively, further comprising a pair of extensible and contractible boots interconnecting said tie rods and respective ends of said outer casing, said adjacent portion having an inner circumferential surface spaced from said steering shaft by a fourth gap, one of said boots being held in communication with said cavity through said fourth gap, said third gap, and said air passages.

14. An electrically operated power steering apparatus according to claim 13, further comprising a second check valve interposed between said rotor and said steering shaft for allowing an air flow from said second gap toward said third gap, the other of said boots being held in communication with said cavity through said nut screw, said second gap, said second check valve, said third gap, and said air passages.

* * * * *

UNITED STATES PATENT AND TRADEMARK OFFICE
CERTIFICATE OF CORRECTION

PATENT NO. : 5,437,349

DATED : August 1, 1995

INVENTOR(S) : Kurahashi et al.

It is certified that error appears in the above-identified patent and that said Letters Patent is hereby corrected as shown below:

ON THE TITLE PAGE:

Item [75]; in the Inventors, delete "Horishi" and insert therefore --Hiroshi--.

Signed and Sealed this

Twentieth Day of February, 1996

Attest:

BRUCE LEHMAN

Attesting Officer  Commissioner of Patents and Trademarks